E. H. Ashcroft.

Railway-Car.

No 2917

Reissued Apr. 14, 1868.

Witnesses,
Samuel N. Crispin
George Andrews

Inventor
E. H. Ashcroft
by his attorney
R. H. Eddy

Sheet 2 - 2 Sheets

E. H. Ashcroft.

Railway-Car.

No. 2917 Reissued Apr. 14, 1868.

Witnesses.
Samuel A. Pope
George Andrews.

Inventor
E. H. Ashcroft.
by his attorney.
R. H. Eddy

United States Patent Office.

EDWARD H. ASHCROFT, OF LYNN, MASSACHUSETTS.

*Letters Patent No.* 54,662, *dated May* 15, 1866; *reissue No.* 2,917, *dated April* 14, 1868.

IMPROVEMENT IN RAILROAD-CAR HEATERS.

The Schedule referred to in these Letters Patent and making part of the same.

TO ALL PERSONS TO WHOM THESE PRESENTS SHALL COME:

Be it known that I, EDWARD H. ASHCROFT, of Lynn, county of Essex, and State of Massachusetts, have invented a new and useful Improvement in Safety-Carriages for Railways, and for other purposes; and I do hereby declare the same to be fully described in the following specification, and represented in the accompanying drawings, of which—

Figure 2:
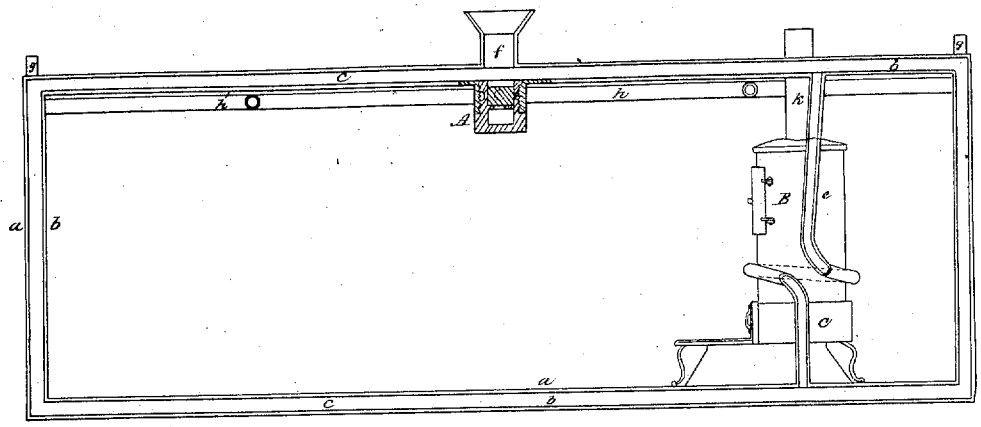
Figure 1:
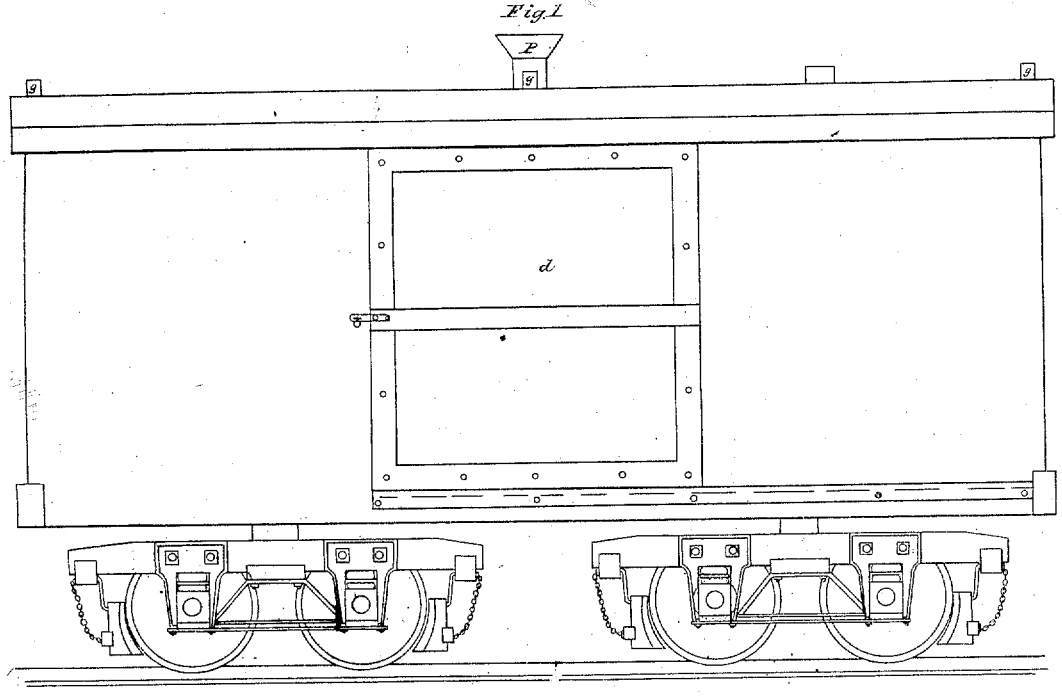

Figure 1 is a side view,

Figure 2 a longitudinal section, and

Figure 3:
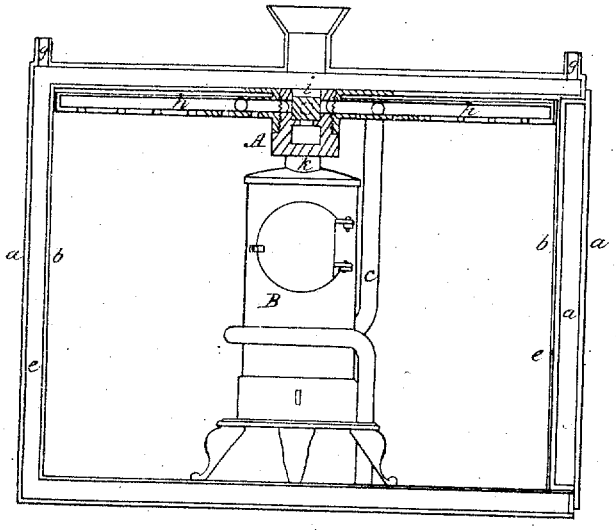

Figure 3 a transverse section of a car or carriage made in accordance with my invention.

The nature of my invention consists in the chamber of a car or other receptacle being surrounded with water-spaces, combined with a perforated coil or pipes, whereby to flood a chamber, if necessary—this as a safety-device; and, secondly, in the combination of said parts with a heating-apparatus, so as to prevent the freezing of the water.

In carrying out my invention, I surround the interior chamber of the car or other receptacle with a space for holding water, such space being arranged on all its sides, excepting in places where it may be necessary to have doorways or window-openings in the car or other receptacle.

My invention is useful not only with reference to cars, but also to safes. I prefer to have my invention to be constructed of iron or steel plates, riveted together, and to a suitable intermediate framing.

In the drawing is shown a chamber or interior of a car, surrounded by casings *a b*, having a water-holding space, *c*, between them. The door *d*, to close an opening or doorway, *e*, leading through one side of the car, may have a fire-proof lining.

The water-space I provide with an induction-tube, *f*, extending upwards from the top of the car, and having a funnel-shaped mouth. I also provide such water-space with one or more eduction or steam or water-escape pipes, *g*, they being arranged at the upper part of the car or other receptacle, as represented.

In connection with such surrounding space or spaces *c*, I employ a series of water-conduits or pipes, *h h*, which may be arranged so as to extend both longitudinally and transversely, each of said pipes being provided with holes on its under side.

All the pipes of the system should communicate with each other, that water let into one shall flow through the rest. Furthermore, the said system of pipes may communicate with a fusible-plug apparatus, made and applied to them and the water-space of the receptacle, so that the fusible plug or part of such apparatus, whilst in a hard state, shall intercept communication between the said pipes and the water-space; and when melted, or in a fluent state, such fusible plug shall be free to flow away or out of its socket, and thereby cause communication between the pipes and water-space to take place, whereby water or steam from the latter may be induced to flow into the pipes, and be discharged by them into the chamber of the car or receptacle, so as to fall upon any goods, wares, or merchandise contained therein. The said fusible-plug apparatus is shown at A, the fusible plug being exhibited at *i*.

In carrying out my said invention with reference to its applicability to a railroad-car, I arrange on the car, or outside of it, or in a chamber or suitable space situated either within or without the car, and so as to move with it, a stove or heating-apparatus, illustrated in one way, as at B in the drawings, and I combine with such stove or heating-apparatus and the water-space a pipe, *e*, to open at one extremity into upper part of the water-space, and at the other, at the lower part of such space, in order that there may be a free flowage of water through the pipes, so the water, whilst flowing through them, may be heated by the heating-apparatus. By such means I am enabled to warm the water in the water-space, and thus warm the chamber of the car or other receptacle.

The fusible plug is to be of a character to melt at a certain temperature, somewhat lower than would be liable to burn or do injury to any material. The pipe *k* of the heating-apparatus may lead through the top of the car, as represented.

By my invention, an express-car can be kept warm, so that the guard in charge may be able to remain in it whilst under way to its destination. For this object, and to keep the water from freezing, I combine with the water-space, about or in the chamber of the car, a heating-apparatus and a circulation-pipe. Therefore,

What I claim as my invention is as follows:

A safety-car, constructed with a water-space, with one or more showering-pipes, and a fusible-plug apparatus, arranged substantially in manner, and so as to operate with respect to the car-chamber, as specified.

I also claim, in combination with a water-space, substantially as herein set forth, a heating-apparatus and circulating-pipes, whereby the water shall be caused to circulate, substantially as herein set forth.

E. H. ASHCROFT.

Witnesses:

S. S. FAHNESTOCK,

EDM. F. BROWN.